Figure 1:
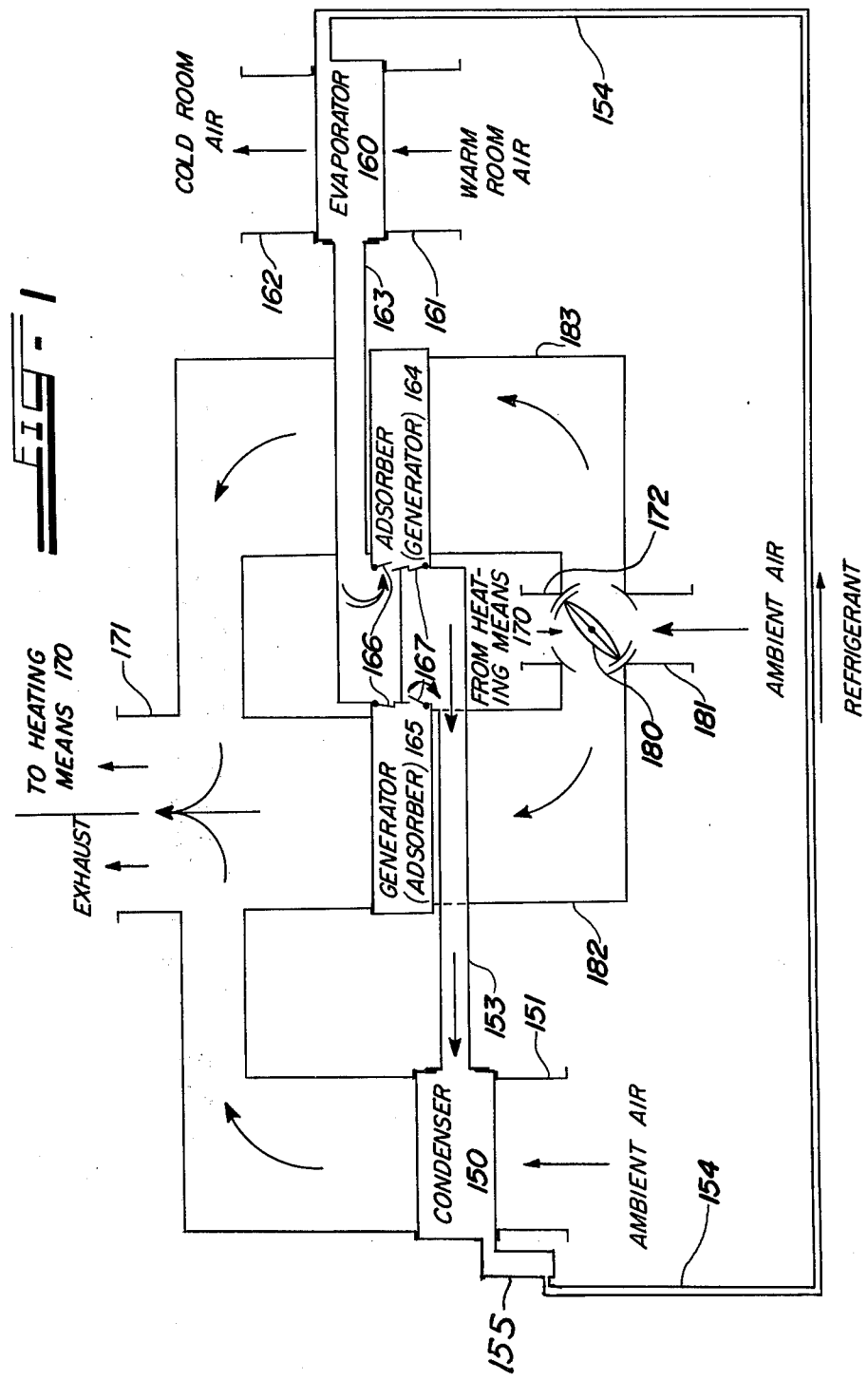

United States Patent [19]

Wurm, Jaroslav

[11] 4,138,861
[45] Feb. 13, 1979

[54] SOLID ADSORPTION AIR CONDITIONING APPARATUS AND METHOD

[75] Inventor: Wurm, Jaroslav, N. Riverside, Ill.

[73] Assignee: Institute of Gas Technology, a nonprofit corporation, Chicago, Ill.

[21] Appl. No.: 780,692

[22] Filed: Mar. 24, 1977

[51] Int. Cl.² .................... F25B 17/08; F25B 29/00
[52] U.S. Cl. .................................... 62/480; 62/325
[58] Field of Search ............................ 62/480, 325

[56] References Cited

U.S. PATENT DOCUMENTS

| | | | |
|---|---|---|---|
| 1,833,901 | 12/1931 | Hull | 62/480 |
| 1,881,208 | 10/1932 | Masterman | 62/480 |
| 2,024,083 | 12/1935 | Young | 62/480 |
| 2,180,634 | 11/1939 | Hubacker | 62/325 |
| 3,517,527 | 6/1970 | Bouchat | 62/325 |

Primary Examiner—Lloyd L. King
Attorney, Agent, or Firm—Thomas W. Speckman

[57] ABSTRACT

A solid adsorption air conditioning apparatus and process using water or ammonia refrigerant in a generator-condenser-evaporator-adsorber cycle wherein the refrigerant is adsorbed on a solid adsorbent coated on the interior of a combination adsorber-generator module and then generated from said adsorbent, the adsorber-generator modules alternately performing each of these functions. The apparatus and process may be used for cooling and heating functions by simple adjustment of dampers. The apparatus and process provides an air conditioning apparatus which may utilize solar heat for a substantial portion of its energy input requirements and does not require any liquid pumping.

14 Claims, 1 Drawing Figure

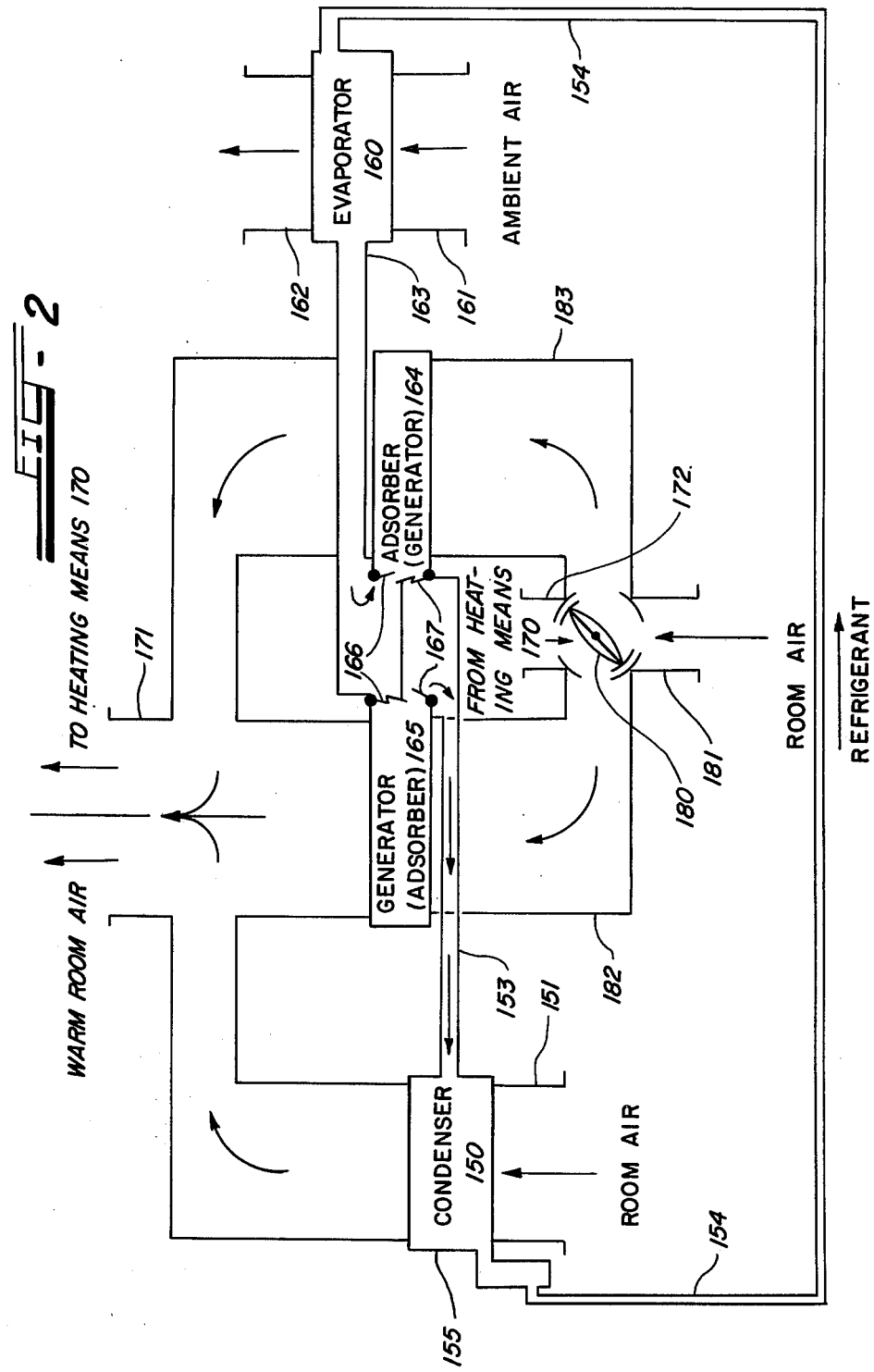

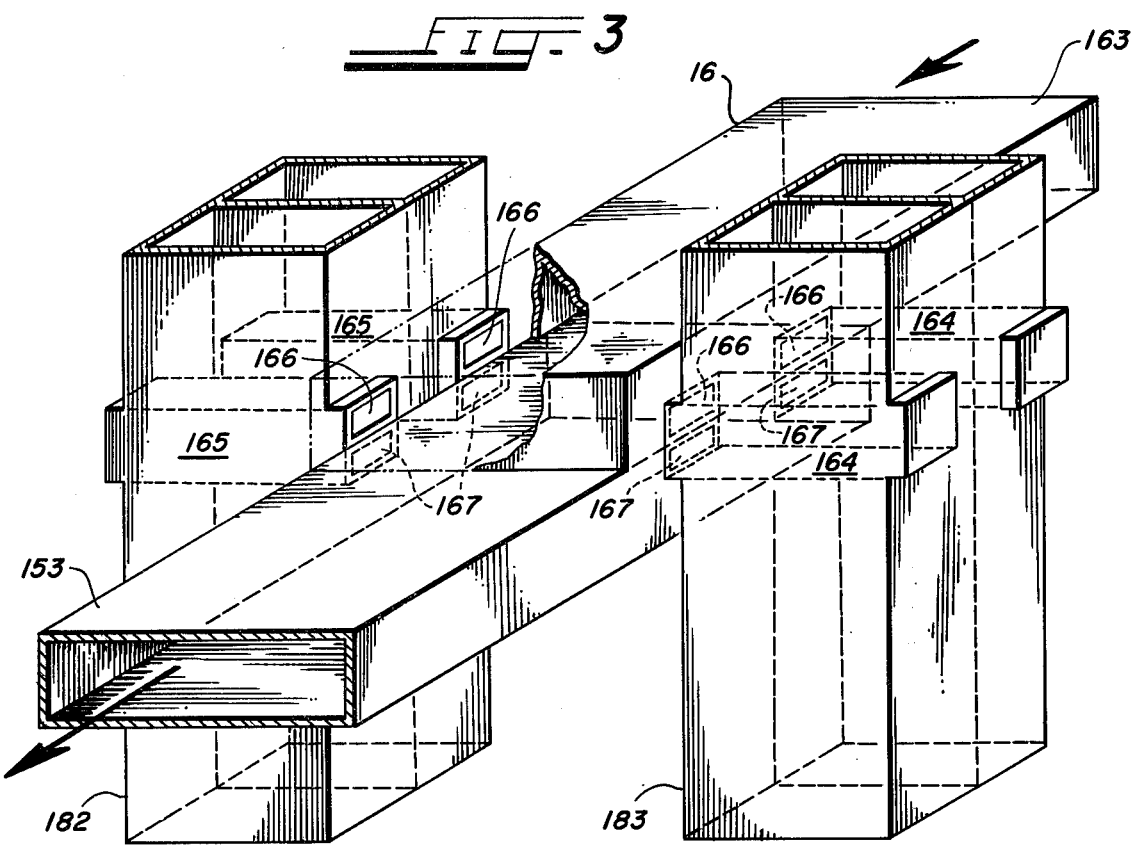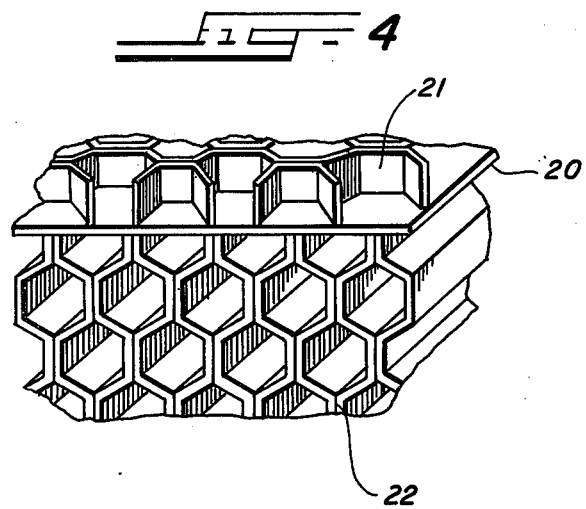

SOLID ADSORPTION AIR CONDITIONING APPARATUS AND METHOD

This invention relates to a solid adsorption air conditioning apparatus and method suitable for residential and commercial capacities and is particularly adapted to low capacities, about 3 tons and less rated at standard air conditioning conditions. Throughout this specification and appended claims, cooling refers to obtaining temperatures normally associated with comfort control. It is also desired that such low capacity cooling apparatus be compact and at least partially solar powered and air cooled.

The work of Michael Faraday in 1824 described a solid absorbent system wherein gaseous ammonia was absorbed on silver chloride. The ammonia-silver chloride was heated at one end of sealed tube while the opposite end of the tube was cooled and liquid ammonia was produced at the cool end. Cooling was then produced by vaporization of the liquid ammonia. (Modern Electric and Gas Refrigeration, Andrew D. Althouse and Carl H. Turnquist, Third Revised Edition, The Goodheart-Willcox Company, Inc., 1939, pages 56–60). The present invention does not require movement of the absorption module as does the Faraday system.

In view of the trend toward smaller residences, more apartments, and various attempts to lower energy consumption by use of architectural features and additional insulation, the need for a low tonnage capacity cooling device is becoming important in the residential market for air conditioners. The production of such a low tonnage capacity cooling device which eliminates the need for water cooling of the absorber and condenser and allows ambient air to be used instead is desirable. With recent developments toward energy saving design and use of higher insulation, the need for an air cooled cooling unit of about 1 ton cooling capacity is important.

Presently available heat actuated cooling apparatuses are limited to a nominal capacity of about two and a half tons. It is difficult to produce smaller capacity units while reducing their physical size.

The apparatus and process of this invention provides an air cooling and heating apparatus which may utilize a Class I refrigerant, even enabling through-the-wall installation. The apparatus and process of this invention does not require liquid handling components, does not require a secondary refrigerant loop when water is used as a refrigerant, and has a potential Coefficient of Performance that is as high or higher than other presently available heat actuated cooling devices, such as absorption air conditioners.

It is an object of this invention to provide an air cooled, low tonnage capacity cooling apparatus and process especially suitable for small or energy conserving residences.

It is another object of this invention to provide a cooling and heating apparatus and process which may utilize solar heat for a substantial portion of its energy input requirements.

It is yet another object of this invention to provide a cooling and heating apparatus and process not requiring any liquid pumping.

It is another object of this invention to provide a single, compact apparatus which may be easily changed from a cooling to heating function by simple dampers.

These and other objects and advantages will become apparent to one skilled in the art upon reading the following description and reference to the figure showing a preferred embodiment wherein:

The figure shows schematically an apparatus according to one embodiment of this invention.

The figure schematically shows an embodiment of a solid adsorption air conditioning apparatus according to this invention in the cooling mode. In this apparatus the condenser always operates as a condenser and the evaporator always operates as an evaporator. Therefore, regeneration of these two heat exchangers to operate in the alternating functions as required by some air conditioning apparatuses, is completely eliminated. The two additional heat exchanger components function alternately, one as a generator-adsorber and the other as an adsorber-generator. That is, while one is functioning as a generator, the other is functioning as an adsorber.

The apparatus of the embodiment shown schematically in the figure does not require any moving parts except for blower means to drive the airstreams and means for operating damper 180. As shown in the figure, room air flows through duct means 161, passes in thermal exchange relationship with evaporator 160 and is reintroduced into the room at a lower temperature through duct means 162. Due to the concentration gradient between the evaporator and adsorber, the refrigerant leaves evaporator 160 through conduit 163 and passes to adsorber 164 which is in thermal exchange with ambient air at a higher temperature than the room air. Generator 165 which contains refrigerant in condition of that at the end of the cycle, as shown for adsorber 164 since generator 165 had previously functioned in the identical fashion as adsorber 164, is shown in thermal exchange relation with air from heating means 170. Heating means 170 provides heated air for thermal exchange with generator 165 at a temperature of up to about 350° F. The only energy input requirement is to provide sufficient heat input to cause high enough thermal gradient to desorb the refrigerant and cause the refrigerant to flow through conduit 153 to condenser 150. Thus, it is seen that generator-adsorber 165 and absorber-generator 164 alternately perform adsorbing and desorbing functions with respect to the refrigerant. Such alternating functions are controlled by inlet valve means 166 and outlet valve means 167 in combination with rotation of damper means 180. Inlet and outlet valve means 166 and 167 are preferably pressure operated while damper means 180 is mechanically operated. When adsorber 164 is in the process of adsorption of refrigerant, damper means 180 is directed such that ambient air enters through duct means 181 and passes through duct means 183 in thermal exchange relationship with adsorber 164 while heated air from heating means 170 is introduced through duct means 172 and directed by damper means 180 through duct 182 in thermal exchange relation with generator 165. It is seen that adsorber and generator 165 thereby alternate cyclically in their functions of adsorption and desorption or generation.

Following desorption from the generator, the contained refrigerant passes through conduit 153 to condenser 150 due to the thermal gradient. Condenser 150 is in thermal exchange relation with the ambient airstream introduced through duct means 151 which passes in thermal exchange relation with condenser 150 warming the ambient air. A portion of the warmer than ambient air after passing in thermal exchange relationship with condenser 150 and adosrber 164 and a portion of the heated air after passing generator 165 may be transferred by duct means 171 to heating means 170 where it is heated to a sufficiently high temperature to provide desorption of the refrigerant from generator 165 as shown in FIG. the figure. A portion of the airstream in duct means 171 is exhausted.

Driven by the pressure gradient between the condenser and evaporator, the refrigerant liquid passes from condenser 150 to liquid accumulator 155. Liquid accumulator 155 may by any suitable mass flow equalizer. The liquid refrigerant leaves accumulator 155 at the bottom by conduit 154, here shown as a capillary tube, and expands to enter evaporator 160. The high pressure condenser side is separated from the low pressure evaporator side by any suitable expansion means which is provided by the capillary in the figure, but may be a thermostatic or pressostatic expansion valve. The refrigerant cycle is then cyclically repeated in the above sequence to provide the desired air conditioning to the enclosed space. It is seen that no mechanical pumping nor mechanical compression means for the refrigerant is necessary in this apparatus and process.

The apparatus and process of this invention may be used to provide heating to a conditioned room. For such purpose the apparatus as shown in the figure is used as a heat pump by modifying the above description for producing cooling in the following manner: the evaporator is placed in thermal exchange relationship with an ambient airstream and the adsorber and condenser are placed in thermal exchange relationship with the stream of air circulated from the air conditioned space to be heated. When the apparatus functions as a heat pump, the source of heat, referred to above as an ambient airstream, may be obtained from any low temperature waste heat storage, solar heat storage, or the like.

The portion of the system including evaporator 160, duct 163 and the adsorber function of adsorber-generators 164 and 165 are at low pressure and hermetically sealed. The refrigerant transfer within this portion of the cycle is in the vapor phase. The low pressure portion of the system is separated from the high pressure portion of the system by valve means 166 and 167 and capillary 154. An unsteady state with respect to the refrigerant exists within the hermetically sealed portion since the adsorber, after having functioned as a generator, is depleted of refrigerant with respect to the evaporator. The refrigerant will then tend to move in the vapor phase toward and readsorb at the adsorber. The vaporization of refrigerant from the evaporator creates a cooling effect in the space to be cooled by the heat input to the evaporator from the conditioned space to be cooled.

The inside of adsorber-generator modules 164 and 165 are coated with a solid adsorbent for adsorption of the refrigerant. It is preferred that the adsorbents provide a high surface area which may be achieved by use of extended surfaces on the interior of the adsorber-generator modules. Likewise, to improve thermal transfer from the refrigerant molecules to airstreams flowing past the outside of the adsorber-generator modules, exterior extended surfaces are used.

A preferred embodiment for the provision of extended surfaces on both the interior and exterior of the adsorber-generator module wall to provide for a large surface area of adsorbent and efficient heat thermal transfer from the refrigerant molecule to an exterior airstream is to have aluminum honeycomb fastened in heat exchange relationship to both sides of the module wall. A structurally strong wall for a hermetically sealed module is obtained by these honeycomb structures having their open core axes at right angles, the honeycomb structure on the interior of the module having its axes at approximately right angles to the wall, while the honeycomb structure to the exterior of the module has its axes approximately parallel to the wall and approximately parallel to the air flow.

Any suitable high surface area structure having high thermal conductivity may be used to provide the extended surfaces for the desired thermal exchange. Metallic, or at least partially metallic structures, are preferred. Wire structures or any shape multi-tubular structures are satisfactory so long as they provide large surface area, thermal conductivity and structural strength. It is preferred that sufficiently large passageways are maintained by the exterior surfaces to provide a low pressure drop upon passage of the thermal exchange air and easy cleanup.

A preferred embodiment may utilize aluminum honeycomb structures produced by American Cyanamid Company under the trademark "DURA-CORE" and having a hydraulic diameter of about 1/16 inch, single wall thickness of 0.00135 inch, free-flow area 0.95 sq. ft. per sq. ft., area density of 721 sq. ft. per cubic ft. and matrix density of 8.966 lbs. per cubic ft. An aluminum sheet wall may be bonded to aluminum honeycombs by use of adhesive films which may be epoxyphenolic adhesives having a metallic filler, such as aluminum. There are a number of suitable bonding agents known to the art containing over 50% metallic filler and reinforcement is possible utilizing metallic fibers. Another preferred embodiment would be to have an aluminum wall having aluminum extended surfaces on both sides in direct contact with the aluminum wall, such as obtained by brazing.

Suitable refrigerants for use in the apparatus and process of this invention are ammonia and water. Water is especially preferred since it is a Class I refrigerant and may be used without any of the hazards associated with the use of ammonia. Water is especially suited due to its high latent heat and its non-toxic properties. To obtain higher efficiencies, the refrigerant filled portion may be evacuated to absolute pressures less than about $1 \times 10^{-3}$ mm Hg, preferably less than about $1 \times 10^{-4}$ mm Hg to remove the presence of non-condensables and to provide for introduction of a controlled amount of refrigerant.

A suitable solid adsorbent for the adsorber-generator surfaces may be any chemical providing water or ammonia, depending upon the refrigerant used, adsorption properties and generation at relatively low temperatures. Lithium chloride, lithium bromide, silica gel, natural zeolites and various molecular sieves are suitable and may be applied to the extended surfaces by methods known in the art. Combinations of any of the above adsorbents may be used. Particularly preferred adsorbents are crystalline zeolites or molecular sieves which provide desired adsorption and desorption properties with respect to water and ammonia.

The zeolite adsorbents used in this invention may include natural crystalline zeolites, such as stilbite, or synthetically produced crystalline metal alumino-silicates known as molecular sieves, activated for adsorption by removing their water of hydration. Molecular sieves belong to the class of compounds known as zeolites, but this latter term is also inclusive of both gel-type amorphous alumino-silicates commonly referred to as zeolites (used as water softeners), and of the crystalline zeolites used in this invention. The amorphous type do not exhibit selectivity based on molecular size.

The unit cell of the crystalline zeolites of this invention have a unit cell formula of $M_{O\cdot A_n}O_3\cdot xSiO_2\cdot yH_2O$ where M is a cation of n valence. The fundamental group in each unit cell, the smallest repetitive entity in the crystalline material, is a tetrahedra of four oxygen anions surrounding a silicon or alumina cation with the metal cation making up the positive charge deficit in each alumina tetrahedra. Among the over 40 commercial zeolites available, we prefer the 3-A, 4-A, 5-A, 10-X, and 13-X types. The 4-A type has a unit cell formula of $Na_{12}[(AlO_2)_{12}(SiO_2)_{12}]\cdot 27\ H_2O$, in which two alumina and two silica tetrahedra link to form a rigid compact group. The latter links with other identical groups to form a cubic cell having a ring aperture on each face, the diameter of this aperture being 4 A, hence the designation 4-A. The central adsorption cavity of the cube has a volume of about 925 $A^3$, which is occupied by the water of hydration which can be driven off by heat. The water enters and leaves through the aperture. About $10^9$ unit cells comprise a cubic crystal in the powder form which measures about 1 $\mu$ along an edge, but which may be as large as 2 $\mu$, and can agglomerate with others to form a particle of size about 10 $\mu$ in size. Some penetration twinning type crystals range up to 30–40 $\mu$ in size.

Of the 12 Na cations in type 4-A, six are located at the pore openings partially blocking them and the remainder are located on the interior of the cube. Any or all of these Na cations can be exchanged with other metal cations, for example by potassium to give an aperture of 3 A, hence the designation 3-A for this type. Type 5-A is formed by exchanging the 12 Na cations with an equivalent of calcium cations, six in number, which locate on the inner face of each cell leaving the apertures unrestricted, of size 4.2A. Type 13-X has the unit cell formula $Na_{86}[(AlO_2)_{86}(SiO_2)106]\cdot 276\ H_2O$, while the 10-X type has an effective ring diameter of about 8 A. All these types have bulk density of about 30 lbs./cu.ft. for powders in the 1–10$\mu$ size range. Especially preferred are types 4 A and 13 X.

The adsorber-generator modules shown as 164 and 165 in the schematic figure represent several individual modules in internally interconnected, parallel arrangement. Preferably two intake valve means 166 and two outlet valve means 167 connect the module interiors through a manifold to duct 163 and duct 153, respectively. It is readily apparent that when there are two or more modules functioning as adsorbers and two or more modules functioning as generators, continuous flow of refrigerant may be obtained. The thermal input requirements for the apparatus as required for generation of refrigerant from the generator, shown as 165 in the figure, may be supplied in whole or in part by solar heat sources or any other heat source such as waste heat from any boiler or chemical process source or waste heat from a nuclear reactor. The duct from heating means 170 may be provided with a suitable damper to provide staged heating with increasing temperature during the refrigerant generation cycle in the generator, shown as 165 in the figure. Staged heating provides better utilization of low temperature heat sources such as waste or solar heat. By simple damper means in the ducting, the temperature of heating provided by such solar or waste heat source may be utilized directly by the generator. In some cases the available heat source may be sufficient to supply the entire thermal input requirements. In cases when the available heat source is not sufficient to supply the entire thermal input requirements, a higher temperature heater means such as an open flame burner or any other relatively higher temperature heat transfer means may be suppled to the latter portion of the airstream passing the generator to provide the necessary final generator temperature. The higher temperature heater means may be located directly in ducts 182 and 183 and adjacent to adsorber-generators 164 and 165 for more direct heating to obtain the final generator temperature. Such heater means would operate intermittently during the final stage of generation. It is readily seen that when multiple adsorbers and generators are utilized a continuous higher temperature heater means, such as an open flame, may be operated continuously by moving the heater means in the desired sequence for heat transfer to the adsorbers and generators. If desired, the heater means may remain stationary and suitable duct means transferring the higher temperature heat to the adsorbers and generators in desired sequence may be utilized by having a movable duct with respect to the adsorbers and generators. By utilization of the staged heating of the generator, the best advantage may be taken of available heat sources and provide the most efficient utilization of necessary additional energy input to obtain required temperatures. This is achieved by raising the temperature of only the final portion of the airstream passing the generator.

The apparatus of this invention may utilize any suitable materials of construction providing sufficient mechanical strength and thermal transfer properties. The condenser and the evaporator may be any suitable heat exchanger for effecting phase change, such as finned tubes as are common in air conditioning practice. Not shown in the figure, but readily apparent to one skilled in the art, are suitable fan means to move the airstream through the apparatus.

It is seen from the above description that the air conditioning apparatus of this invention may be adjusted by simple ducting adjustments to provide a process for providing cooled air or heated air to a closed space. The process for air conditioning, including both heating and cooling, has the following steps: generating refrigerant by desorption from a solid adsorbent on the interior of a generator (adsorber) functioning as a generator by heating said generator while removing heat from a condenser in thermal insulated communication with the generator causing the refrigerant to move in the vapor state to the condenser and to condense to a liquid state within the condenser; expanding the liquid to an evaporator; then applying heat to the evaporator while removing heat from the adsorber (generator) functioning as an adsorber in thermal insulated communication with the evaporator causing the refrigerant to vaporize and pass from the evaporator to the adsorber (generator) in the vapor phase and adsorb on the solid adsorbent on the interior of the adsorber; and recycling the thermal conditions in sequence to provide desired conditioning to the enclosed space. When it is desired to provide cooled air to the conditioned space, the airstream to be cooled is passed in thermal exchange relation to the evaporator. When it is desired to provide heated air to the conditioned space, the airstream to be heated is passed in thermal exchange relation to the adsorber and condenser and the apparatus functions as a heat pump.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A process for air conditioning comprising the steps: generating refrigerant by desorption from a solid adsorbent on the interior of a generator (adsorber) functioning as a generator by heating said generator while removing heat from a condenser in thermal insulated and valved communication with said generator causing said refrigerant to move in the vapor state to the condenser and to condense to a liquid state within the condenser; continuously expanding the liquid to an evaporator; then applying heat to said evaporator by passing an airstream to be cooled in thermal exchange relation to said evaporator cooling the airstream for introduction to the air conditioned space while removing heat from an adsorber (generator) functioning as an adsorber in thermal insulated and valved communication with said evaporator causing said refrigerant to vaporize and pass from the evaporator to the adsorber (generator) in the vapor phase and adsorb on said solid adsorbent on the interior of said adsorber which then becomes said generator (adsorber); and recycling said thermal condition sequence to provide desired conditioning to an air conditioned space.

2. The process of claim 1 wherein multiple generator (adsorber) and adsorber (generator) modules are used in parallel relationship.

3. The process of claim 1 wherein said refrigerant is selected from the group consisting of ammonia and water.

4. The process of claim 1 wherein said adsorbent is selected from the group consisting of molecular sieves, crystalline zeolites, silica gel, lithium chloride, lithium bromide and combinations thereof.

5. The process of claim 1 wherein said refrigerant is water and said adsorbent is molecular sieve.

6. The process of claim 1 wherein the thermal input requirements to said generator are provided by a thermally staged increasing temperature airstream.

7. The process of claim 1 wherein said expanding comprises passing said liquid through capillary tubing.

8. The process of claim 1 wherein said expanding comprises passing said liquid through an expansion valve.

9. An apparatus for air conditioning comprising: an air cooled evaporator in thermal insulated and valved communication with an adsorber (generator) means the adsorber-generator means having a solid adsorbent on the interior surface thereof; ducting means providing ambient air in thermal exchange relation to said adsorber (generator) means while functioning as an adsorber and providing heated air in thermal exchange relation to the generator (adsorber) means while functioning as a generator; a heating means in damper controlled communication with said ducting means; an air cooled condenser in thermal insulated and valved communication with said generator; and an expansion means providing liquid flow communication from said condenser to said evaporator.

10. The apparatus of claim 9 having ducting means to pass air from a space to be conditioned in thermal exchange relation with said evaporator and returning it to a space to be cooled.

11. The apparatus of claim 9 having ducting means to pass air from a space to be conditioned in thermal exchange relation with said adsorber and returning it to a space to be heated.

12. The apparatus of claim 9 wherein the interior of the adsorber-generator module wall has high surface area extended surfaces.

13. The apparatus of claim 12 wherein the exterior of the adsorber-generator module wall has high surface area extended surfaces.

14. The apparatus of claim 9 wherein duct means providing thermal input requirements from a heater means to said generator means are provided with damper means to provide a thermally staged increasing temperature airstream.

* * * * *